United States Patent
Schlittenbauer et al.

(10) Patent No.: US 9,644,737 B2
(45) Date of Patent: May 9, 2017

(54) MOTOR VEHICLE AND METHOD FOR CONTROLLING A TRANSMISSION IN A MOTOR VEHICLE

(71) Applicant: AUDI AG, Ingolstadt (DE)

(72) Inventors: Michael Schlittenbauer, Ingolstadt (DE); Marcus Kuehne, Ingolstadt (DE); Ulrich Mueller, Ingolstadt (DE); Megan McClain, San Francisco, CA (US); Nathaniel Paffett-Lugassy, San Francisco, CA (US)

(73) Assignee: AUDI AG, Ingolstadt (DE)

( * ) Notice: Subject to any disclaimer, the term of this patent is extended or adjusted under 35 U.S.C. 154(b) by 152 days.

(21) Appl. No.: 14/678,400

(22) Filed: Apr. 3, 2015

(65) Prior Publication Data
US 2015/0285377 A1   Oct. 8, 2015

Related U.S. Application Data

(60) Provisional application No. 61/974,717, filed on Apr. 3, 2014.

(51) Int. Cl.
*F16H 63/42*   (2006.01)
*G02B 27/01*   (2006.01)

(52) U.S. Cl.
CPC ........... *F16H 63/42* (2013.01); *G02B 27/017* (2013.01); *F16H 2063/423* (2013.01); *G02B 2027/014* (2013.01); *G02B 2027/0138* (2013.01); *G02B 2027/0165* (2013.01)

(58) Field of Classification Search
None
See application file for complete search history.

(56) References Cited

U.S. PATENT DOCUMENTS

| | | | | |
|---|---|---|---|---|
| 5,017,916 | A * | 5/1991 | Londt | F16H 63/42 340/439 |
| 2013/0002666 | A1* | 1/2013 | Mihara | G09G 3/003 345/419 |
| 2013/0197752 | A1* | 8/2013 | Planche | F16H 63/42 701/36 |
| 2014/0267548 | A1* | 9/2014 | Yee | G06F 3/017 348/14.03 |

FOREIGN PATENT DOCUMENTS

| | | |
|---|---|---|
| DE | 10046904 | 4/2002 |
| DE | 102008018279 | 11/2008 |
| DE | 102011121398 | 6/2013 |

* cited by examiner

*Primary Examiner* — Edwin A Young
(74) *Attorney, Agent, or Firm* — Staas & Halsey LLP

(57) ABSTRACT

A method controls a transmission in a motor vehicle. The method involves displaying transmission information on a primary display, determining when a hand is approaching a gear selector, and initiating a display of, and then displaying, gear selection information on a secondary display when the hand is approaching the gear selector, before the hand touches the gear selector, the secondary display being a multi-use changeable display that, at different times, displays information for different systems of the motor vehicle. The method may therefore provide the information to the driver when it is needed, before the gear is shifted.

16 Claims, 5 Drawing Sheets

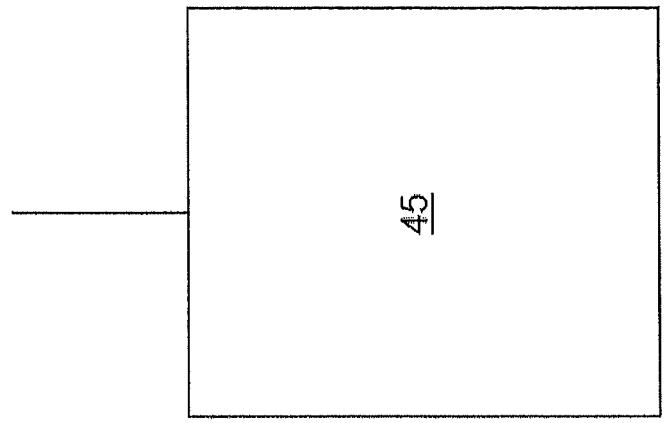
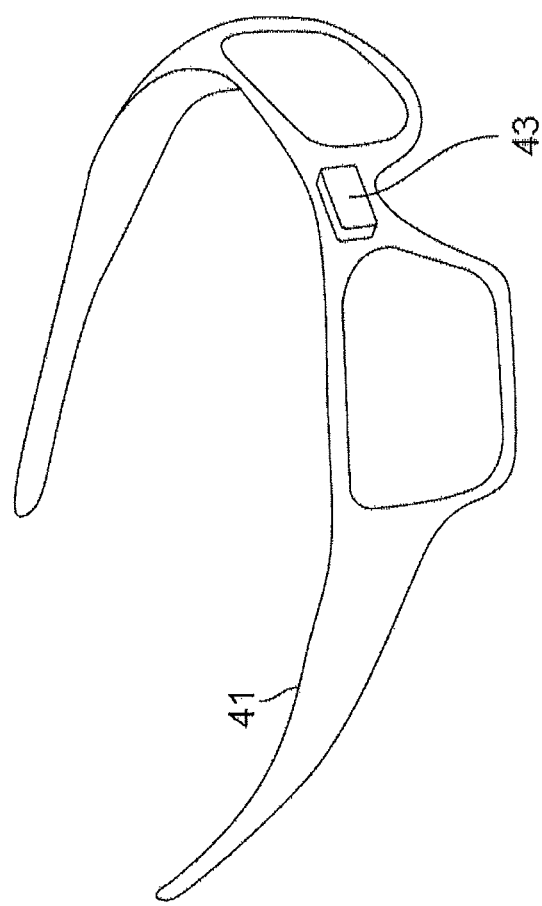
FIG. 4

MOTOR VEHICLE AND METHOD FOR CONTROLLING A TRANSMISSION IN A MOTOR VEHICLE

CROSS REFERENCE TO RELATED APPLICATIONS

This application is based on and hereby claims priority to U.S. Provisional Application No. 61/974,717 filed on Apr. 3, 2014, the contents of which are hereby incorporated by reference.

BACKGROUND

The present invention relates to motor vehicles and to a method for controlling a transmission in a motor vehicle.

Attention has recently focused on vehicle safety problems associated with drivers failing to pay full attention to driving. For example, it is been argued that if a driver attempts to make a phone call or send a text message, the risk of accident is increased. In addition to cell phone use, a driver can also be distracted when it comes time to change a vehicle parameter. Particularly in vehicles capable of driving at a high speed, it is important for the driver to focus attention on the road.

Even changing a gear can distract a driver. For example, to extract maximum performance from the engine, the driver of a manual transmission might want to delay shifting until the engine approaches its rotational speed limit. However, looking down at the tachometer can distract the driver. Moreover, unlike automatic transmissions, a manual transmission will allow the driver to engage a gear that could damage the engine.

Most manual transmissions provide the driver with more tactile feedback. The gear shift activator may be moved through a shift pattern. The driver can feel that first gear is different from fifth year. However, the number of forward gears in a manual transmission is increasing. When there are more possible positions for the gear selector, it is more difficult for the driver to identify with certainty the currently engaged gear. More advanced transmission technologies tend to provide the driver with less manual feedback.

There can also be a distraction problem in a vehicle having a transmission with both automatic and manual modes. This transmission is also referred to as a "manumatic" transmission. In automatic mode, the transmission behaves like a conventional automatic transmission, for example by moving the vehicle forward when in "drive." In manual mode, the driver can manually choose between the different forward gears of an otherwise automatic transmission. Different manufacturers use different labels for this manual mode. For example, Tiptronic, Geartronic, Touchshift, Sporttronic and clutchless manual all refer to the manual mode. The manual mode allows the driver to have more control of upshifts and downshifts, perhaps improving performance. When in manual (Tiptronic) mode, the driver upshifts by making one gear selection maneuver, and downshifts by making another gear selection maneuver. However, these maneuvers are the same regardless of which gear the driver is shifting from or to. In manual (Tiptronic) mode, the driver can't "feel" which gear is engaged. To know the currently engaged gear before making a shift maneuver, the driver must look away from the road, perhaps at a time when the driver's attention is most needed.

A line-of-sight display is a display within the driver's line-of-sight when the driver is operating the motor vehicle. For example, information might be projected onto the windshield of the vehicle in what's known as a "heads-up display." A heads-up display is sometimes used to display a map for a vehicle navigation system. A heads-up display has only a limited display area. Adding information to the heads-up display might require removal of other information, such as the map. Rather than increase safety, the lack of the map while displaying other information could cause an accident.

SUMMARY

One potential goal is to improve vehicle safety while providing a driver with gear selection information. The inventors propose a method for controlling a transmission in a motor vehicle. The method involves displaying transmission information on a primary display, determining when a hand is approaching a gear selector, and initiating a display of, and then displaying, gear selection information on a secondary display when the hand is approaching the gear selector, before the hand touches the gear selector, the secondary display being a multi-use changeable display that, at different times, displays information for different systems of the motor vehicle. The method may therefore provide the information to the driver when it is needed, before the gear is shifted.

In a particularly useful embodiment, the secondary display is an instrument cluster display or a heads-up display projected onto a windshield of the motor vehicle. Both of these displays are within a driver's line-of-sight when the driver is operating the vehicle. They minimize distraction. The heads-up display can show the information in the driver's direct line of sight while the driver looks at the road/air/water.

According to a beneficial option, the transmission information comprises engine speed and vehicle speed, the gear selection information comprises a currently engaged gear, the primary display is a first portion of an instrument cluster display, and the transmission information is displayed before the hand is approaching the gear selector and maintained after the gear is changed. Even though the transmission information might be available in the cluster, it might not sufficiently alert the driver because the display is not as conveniently located, because it remains displayed even when not used and/or because it does not call attention to the most relevant information. Thus, the secondary display may be very useful.

Advantageously, if it is determined that only a passenger's hand is approaching the gear selector, the gear selection information is not displayed in the secondary display. This avoids the potential of disturbing the driver if the passenger happens to be reaching toward the gear selector.

According to one advantageous development, a time-of-flight camera determines when the hand is approaching the gear selector. Time-of-flight cameras have proven to be particularly accurate and are already being installed in some motor vehicles. A time-of-flight camera can also be used to determine whether a driver's hand or the passenger's hand is approaching the gear selector.

A further advantage is achieved if the gear selection information is selected from the group consisting of a currently engaged gear, engine speed and a new gear suggestion. This may be the information most needed before changing gears.

It might be particularly helpful if the gear selection information remains displayed in the secondary display while the hand touches the gear selector. During this time, the driver is thinking about changing gears. When the hand is removed from the gear selector, the gear selection information might remain displayed on the secondary display for a time shorter than a time period that would be required for a driver to understand the gear selection information if the gear selection information first appeared on the secondary display only after the gear selector was moved. If the driver knows the information in advance, it is not necessary to maintain the information for a long time after the gear is changed. According to one preferred embodiment, the gear selection information is removed from the secondary display as soon as the hand is removed from the gear selector. This can minimize distraction. The driver may not care about the gear selection information once in a new gear.

According to a different embodiment, the gear selection information is removed from the secondary display even before the hand is removed from the gear selector. For example, the information might be removed as soon as the driver shifts gears. The information is needed before the gear shift. After shifting gears, if the driver happens to engage the wrong gear, the engine and transmission will provide the driver with stronger feedback than would be possible with the secondary display.

Particularly useful is if the gear selection information is displayed for a display time that depends on how fast the motor vehicle is currently travelling, such that at higher speeds, the display time is shortened. This could be done, for example, by requiring that the hand be closer to the gear selector before initiating the display of the gear selection information, and/or by reducing the display time for which the gear selection information remains displayed after initiation. At higher speeds, things change more quickly. However, the driver might be particularly alert and able to understand the information in less time than would otherwise be required. By reducing the display time, it might be possible to reduce distraction without any loss in function.

In a particularly useful development, the secondary display displays navigation information for a navigation system of the motor vehicle, and at least a part of the navigation information is excluded from the secondary display when displaying gear selection information in the secondary display. The display area is therefore efficiently used without overly distracting the driver.

The inventors also propose a motor vehicle. The motor vehicle has a transmission having a gear selector, a primary display to display transmission information and a secondary display to display gear selection information, the secondary display being a multi-use changeable display that, at different times, displays information for different systems of the motor vehicle. The motor vehicle also has a gesture recognition device to recognize when a hand is approaching the gear selector. The motor vehicle further has a controller to initiate a display of, and then display, gear selection information on the secondary display while the hand is approaching the gear selector, before the hand touches the gear selector. All statements with regard to the method can be analogously applied to the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 is a schematic perspective view of an optical head-mounted display.

DETAILED DESCRIPTION OF THE PREFERRED EMBODIMENT

Figure 1:
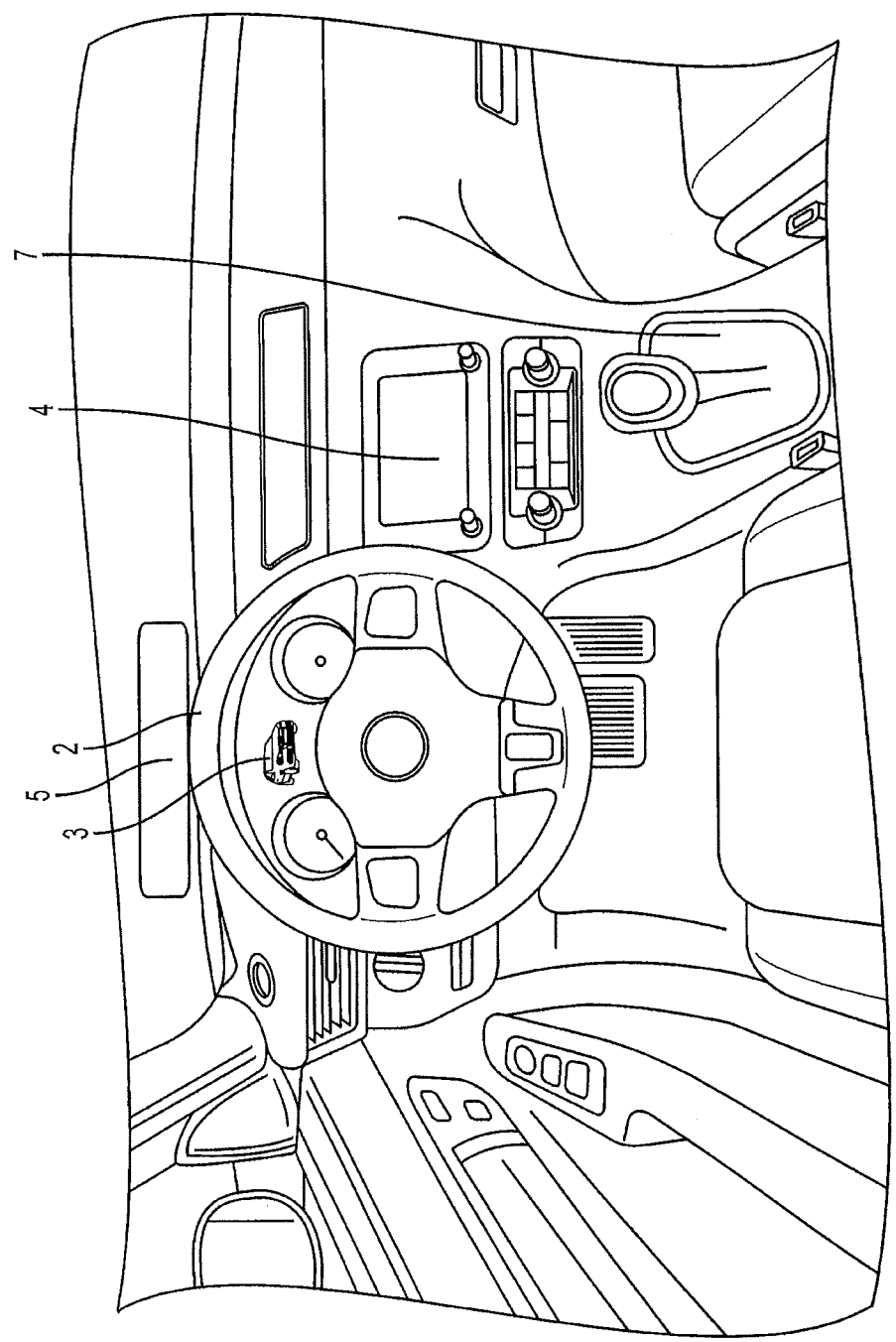
FIG. 1 schematically shows an interior of a motor vehicle.

Reference will now be made in detail to the preferred embodiments of the present invention, examples of which are illustrated in the accompanying drawings, wherein like reference numerals refer to like elements throughout.

The proposed method and device provide a "gear preview," in which the driver can be provided with information about the transmission when he/she intends to interact with the transmission, prior to him/her having to actually shift gears. This can be accomplished using gesture recognition to determine when the driver is reaching for the gear selector. A time-of-flight camera or other recognition technology can be used for gesture recognition. Upon determining that the driver or passenger is reaching for gear selector, the currently engaged gear or the engine speed, for example, is appropriately displayed. Also, if the information is provided on a display within the driver's line-of-sight, the proposed method and device may allow the driver to maintain focus on driving. Is not necessary for the driver to look away to learn the gear selection information.

Figure 5:
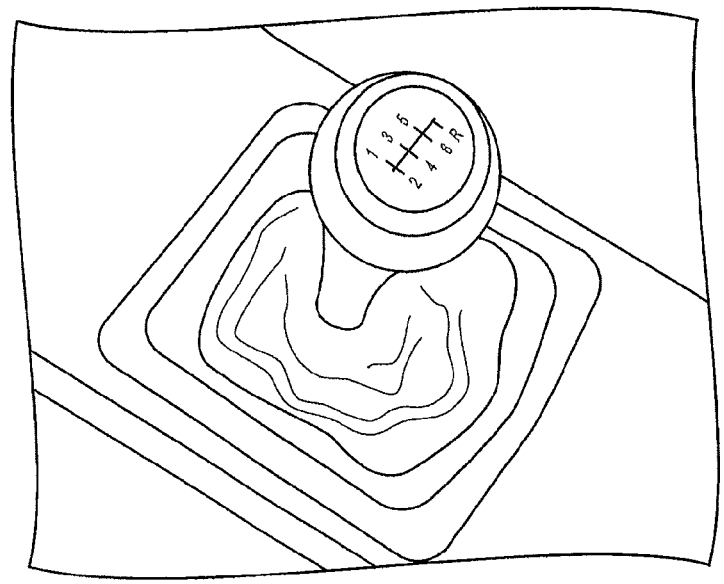
FIG. 5 is a schematic view of a manual transmission gear selector.
Figure 6:
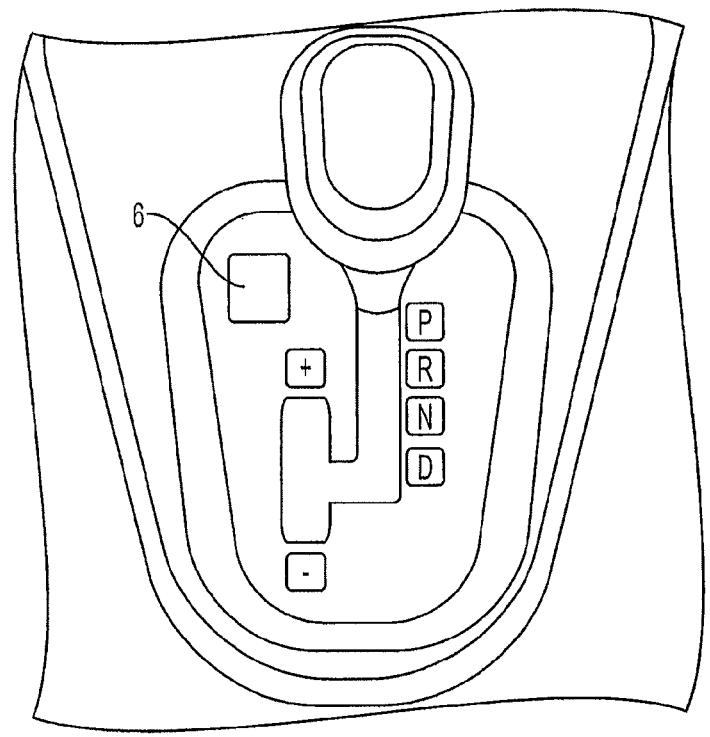
FIG. 6 is a schematic view of an automatic-Tiptronic gear selector.

FIG. 1 schematically shows the interior of an automobile, which is one example of a motor vehicle. However, the inventors' proposals are not restricted to automobiles or land motor vehicles and may be applied to boats, aircraft and other types of motor vehicle. Reference numeral 7 represents a gear selector to control the transmission. Gear selector 7 can be seen in more detail in FIGS. 5 and 6. FIG. 5 schematically shows a manual transmission gear selector, and FIG. 6 schematically shows an automatic-Tiptronic gear selector.

Figure 2:
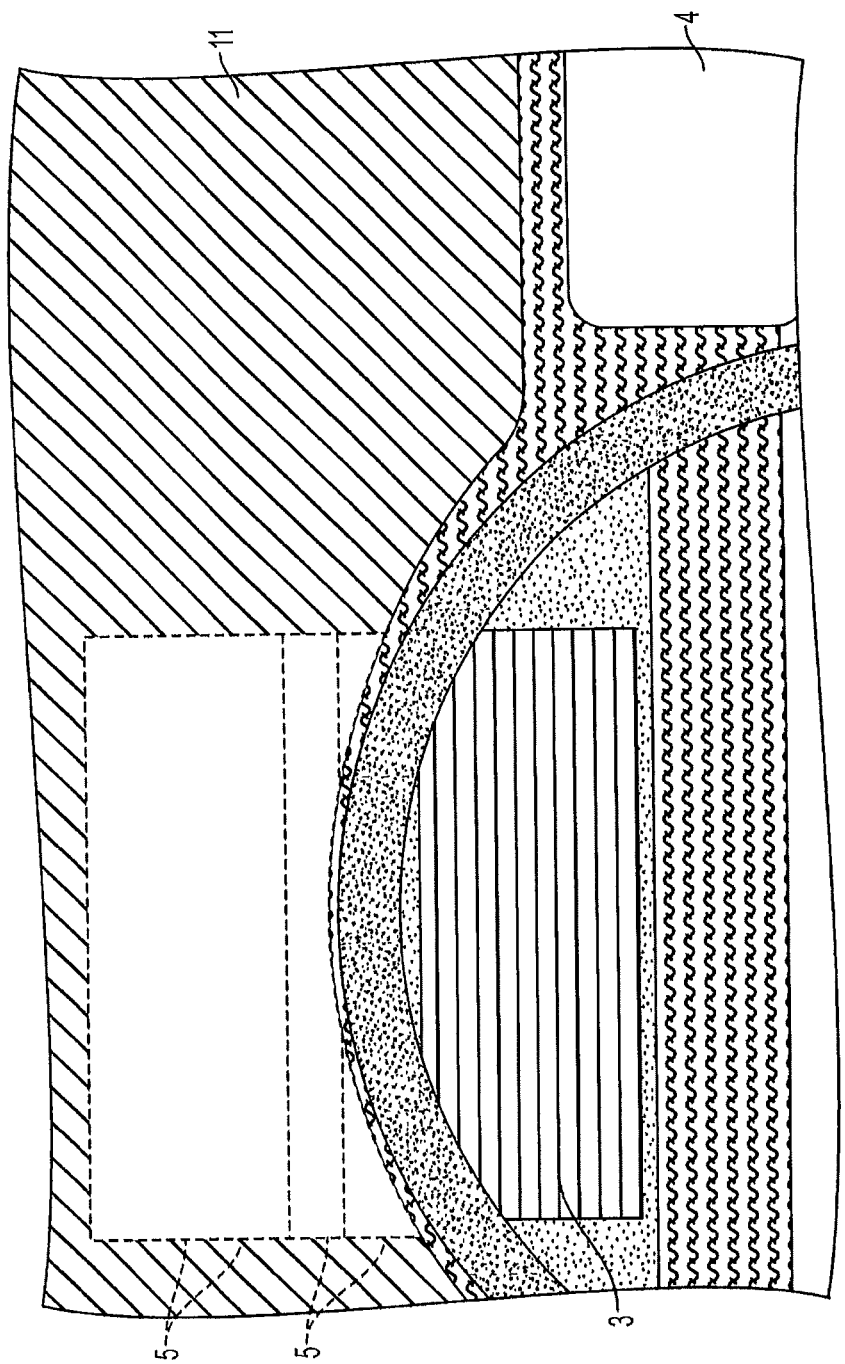
FIG. 2 shows different display possibilities within the motor vehicle.

Reference numeral 4 represents a center console display. Reference numeral 3 represents the multi-component cluster display. A heads-up display 5 is projected onto the windshield in front of the driver. FIG. 2 shows the heads-up display 5 on the windshield 11, and the cluster display 3 in more detail.

One important aspect of the inventors' proposals is recognizing when the driver is reaching for a gear selector, before the driver has actually touched the shift knob. There are various ways this gesture recognition can be accomplished. One preferred way is using a time-of-flight camera.

Although not restricted to any particular equipment, a time-of-flight camera (ToF camera) may be a range imaging camera system that resolves distance based on the known speed of light, measuring the time-of-flight of a light signal between the camera and the subject for each point of the image. The time-of-flight camera is a class of scannerless LIDAR, in which the entire scene is captured with each laser or light pulse, as opposed to point-by-point with a laser beam such as in scanning LIDAR systems. A time-of-flight camera is able to determine 3D depth and IR grayscale information. It operates with a number of modulated light transmitters (for example three infrared LEDs) and a camera for sensing the light as it reflects off elements in the field of view. The camera is able to measure the time-of-flight of each pixel, allowing it to capture complete 3D information. PMD Technologies™ is one manufacturer of time-of flight cameras.

In addition to time-of-flight cameras, there are other ways to accomplish gesture recognition. For example, radar could be used. Also, a camera could be focused directly in front of the gear selector. Moreover, a capacitive sensor, which usually detects when a surface is contacted, could detect when a person is approaching. An infrared sensor is another example of a device that could be used for gesture recognition.

With the proposals, gear selection information is displayed on a "secondary display" when the driver of the vehicle reaches for the gear selector. This "secondary display" is in addition to, and different from the primary display on which the transmission information is ordinarily displayed. The gear selector device 7 shown in FIG. 1 and with more detail in FIGS. 5 and 6, is a potential primary display. Referring to FIG. 5, for a manual transmission, the transmission information might include the listing of the forward gears (1, 2, 3 . . . ) and the reverse gear (R). If the driver reads this information, the driver may be able to understand, based on the position of the gear selector, which gear is currently engaged.

Referring to FIG. 6, for an automatic-manual transmission, when the gear selector is in automatic mode and at one of positions P, R, N or D in the automatic gate, the P, R, N and D indicators might provide transmission information. When the gear selector is moved to the position D and then the lever is moved to the left, the transmission enters the manual (Tiptronic) mode. To shift up a gear in manual (Tiptronic) mode, the gear selector is briefly pushed forward in the Tiptronic gate, toward the "+" sign. Likewise, to shift down a gear in manual (Tiptronic) mode, the gear selector is briefly pulled backwards in the Tiptronic gate, toward the "−" sign. A display 6 could conceivably be used to show the currently engaged Tiptronic gear. For example "M3" might be displayed to represent the third preprogrammed forward gear. The "+" and "−" signs also provide transmission information, when considered together with a push or pull action of the gear selector.

The cluster display 3 ordinarily includes a tachometer and a speedometer. These instruments provide transmission information. If the car has an automatic-manual transmission, the currently engaged Tiptronic gear might also be displayed in a primary area of cluster 3.

For the secondary display, the heads-up display 5 can be used to display gear selection information. In addition, the cluster 3 might have a primary display area for the tachometer and speedometer, and a secondary display area. The secondary display area of the cluster 3 ordinarily would be offset to call the driver's attention to the information. For example, the secondary display area might be higher on the cluster 3, closer to the windshield, so that it is easier for the driver to see.

In addition to display areas 3 and 5, other display devices can be used for the gear selection information. For example, if a display is incorporated into the rearview mirror or the side view mirror, or if a small display (perhaps of LEDs) is provided above the steering column, gear selection information may be provided there. Another example of a secondary display is a wearable optical head-mounted display, such as Google Glass™. FIG. 4 is a schematic perspective view of an optical head-mounted display 41, which displays information in a smartphone-like hands-free format. This display can communicate with the motor vehicle via wireless data transmission, using a wireless transmitter/receiver 43 in the glasses and a wireless transmitter/receiver 45 in the motor vehicle.

The secondary display may be a multiuse display. For example, the cluster display area 3 may be used to display engine or vehicle information, for example temperatures, pressures or speeds. The heads-up display 5 may be used to display a map, a left or right turn arrow or other navigation information. When the gear selection information is displayed on the secondary display, at least a portion of this other information (infotainment information, engine/vehicle information, navigation information, etc.) may be removed from the secondary display. To minimize distraction, it is important that the gear selection information be displayed only when it is of use.

The secondary display is preferably a line-of-sight display normally within the driver's line-of-sight when driving the motor vehicle. For example, the heads-up display is on the windshield, which the driver must look through to see the road/water/air. The cluster display area is positioned within the driver's peripheral vision so that the information can be read while the driver is looking at the road/water/air. The secondary area of the cluster 3 requires, at most, only a quick glance down.

The gear selection information can include various gear selection information, such as the currently engaged gear, engine speed and a new gear suggestion, etc. Since the display area of the secondary display is restricted and other information may be important, it is preferable to only display the gear selection information that is most important. For an automatic-manual transmission, the P, R, N and D information might be most helpful to the driver in automatic mode. In manual (Tiptronic) mode, the currently engaged manual gear (M1, M2, M3, etc.) might be most important. For a manual transmission, the currently engaged gear is very important to the driver. Also, to avoid exceeding the maximum engine speed, it may be crucial for the manual transmission driver to know the current engine speed.

The gear selection information is displayed when the driver of the motor vehicle reaches for the gear selector, before the gear is changed and even before the gear selector is touched. The display remains on the secondary display device just as long as that hand is in the vicinity of the gear selector. Display of the information may be triggered when the hand is within 30 cm, preferably 20 cm and more preferably 10 cm from the actuator (gear selector). The display remains long enough for the gear selection information to be read and understood, but not too long to distract the driver. For example, the information may remain only for a predetermined time, with this predetermined time being shorter than the time that would be required to understand the information if the information first appeared only after the gear was shifted. For example, after the actuator is moved (or after the actuator is released) the information remains less than 5 seconds, preferably less than 3 seconds and in particular less than 1 second. In one embodiment, the gear selection information disappears as soon as the gear is changed or the gear shift is released. After the gear has been changed, it is too late for the information to help the driver, and many drivers put their hand back on the steering wheel before again shifting gears.

At higher speeds driving conditions change more quickly. Some drivers might be able to more quickly understand the information in the secondary display when they are very alert and driving at high speeds. Some drivers may not use the secondary display. Because driving conditions change quickly at higher speeds, it might be useful to minimize the display time such that at higher speeds, the display time is shortened. For example, if the display is normally triggered when the hand is 30 cm from the gear selector, this distance could be decreased as speed increases. In city traffic, perhaps 1-7 seconds, preferably 1-6 seconds particularly 5 seconds or less is long enough for the gear selection information to be read and understood by the driver. The display time after initiation can be reduced as the speed is increased.

The secondary display is controlled by a CPU or other control device. To determine when the driver's hand is no longer in the vicinity of the gear selector, the time-of-flight camera or other gesture recognition device may provide feedback to the control device. Alternatively, the control device could control the secondary display based on feedback information from the gear selector or transmission. For example, a capacitive sensor on the gear selector could be used to determine when the driver's hand has been removed from the gear selector or is no longer in the vicinity of the gear selector. The transmission can provide the control device with feedback information regarding vehicle speeds, engine speeds and when the driver has shifted gears.

Line-of-sight displays, such as the cluster display and the heads-up display, are directly within the driver's line-of-sight. It is therefore important that the information be displayed on a line-of-sight display only when the driver is reaching for the gear selector. For example, it would not be good to disrupt the driver if the passenger reaches toward the gear selector. For this reason, is important for the gesture recognition system to also recognize which occupant of the motor vehicle is reaching for the gear selector. The time-of-flight camera mentioned above can be used to detect which occupant of the motor vehicle is reaching for the gear selector. In addition, it is conceivable that another device could check if the adjustment is being made by the driver. For example, a steering wheel touch sensor could detect if the driver has both hands on the steering wheel. In this case, it can be concluded that the driver is not reaching for the gear selector and the line-of-sight display should not be changed.

Figure 3:
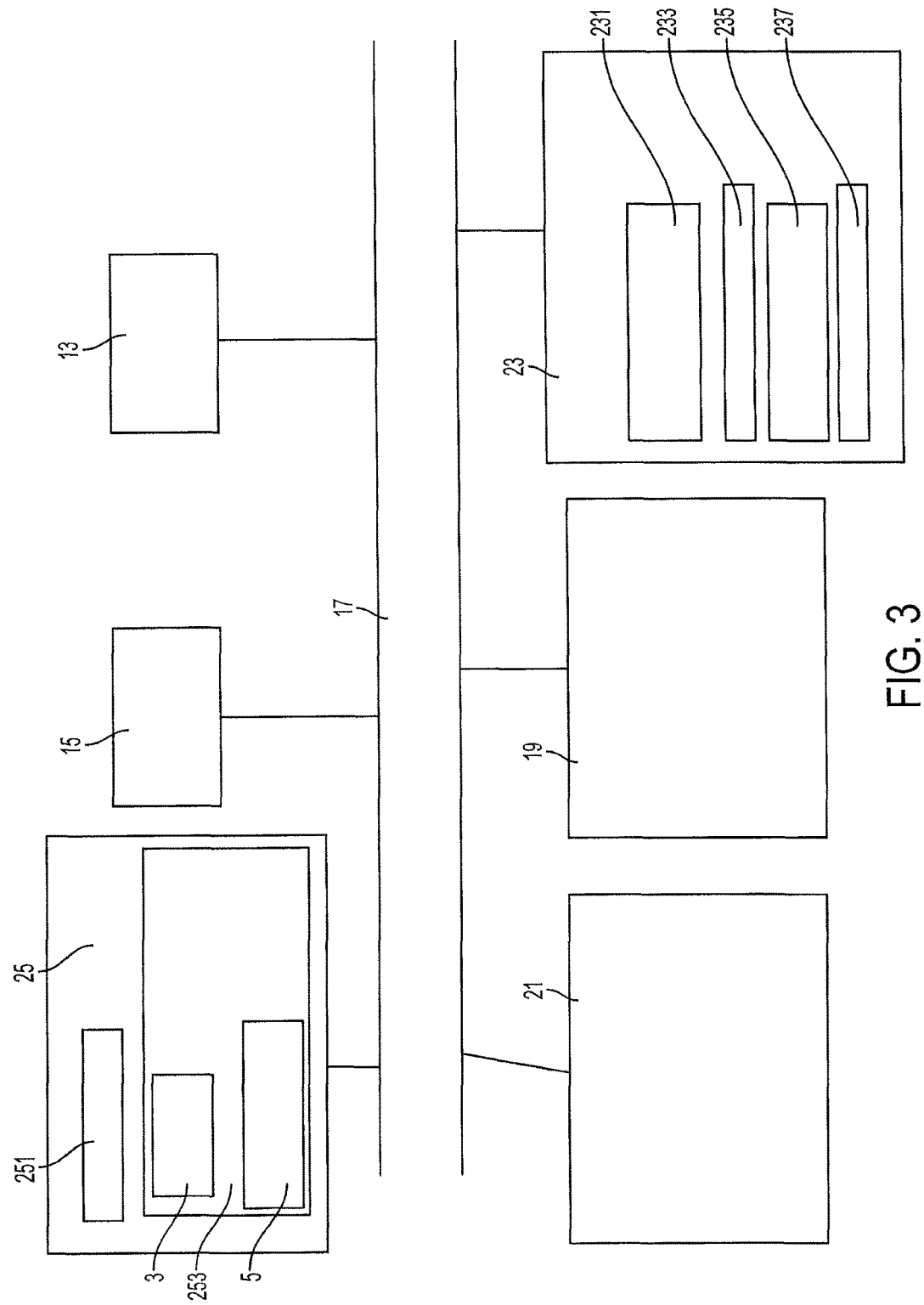
FIG. 3 is a block diagram showing input, output and computing devices for the proposed method and device.

Although the features of the proposals are described separately, the described features, functions, operations, and/or benefits can be freely combined. The word (prefix or suffix article) "a" refers to one or more. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. FIG. 3 is a schematic drawing of possible equipment to implement the proposed features. As illustrated in FIG. 3, the equipment can include a computing controller 15 (CPU) or computing processing system (e.g., one or more processing devices (e.g., chipset(s), including memory 13 or a hardware logic circuitry based computer processor(s) that processes or executes instructions stored in a memory, namely a software/program)), computer readable media 21 (e.g., that stores information objects), a transmission communication interface 19 (wired or wireless data network interface), input devices 23, and/or output devices, which are all coupled (directly or indirectly) to each other, for example, can be in communication with each other through one or more data communication buses 17, such as a CAN bus, FlexRay bus, etc. Examples of input devices include a gesture recognition camera 231, a capacitive sensor 233, a transmission gear selector 235 and a steering wheel sensor 237. Examples of output devices 25 include the primary display 251 and the secondary display 253. Examples of the non-transitory computer-readable media include a magnetic recording apparatus, an optical disk, a magneto-optical disk, and/or volatile and/or non-volatile semiconductor memory (for example, RAM, ROM).

An apparatus or device refers to a physical machine that performs operations, for example, a computer (physical computing hardware or machinery) that implements or executes instructions, for example, executes instructions by way of software, which is code executed by computing hardware including a programmable chip (chipset, computer processor, electronic component), and/or implements instructions by way of computing hardware (e.g., in circuitry, electronic components in integrated circuits).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

What is claimed is:

1. A method for controlling a transmission in a motor vehicle, comprising:
   displaying transmission information on a primary display;
   determining when a hand is approaching a gear selector; and
   initiating a display of, and then displaying, gear selection information on a secondary display when the hand is approaching the gear selector, before the hand touches the gear selector, the secondary display being a multi-use changeable display that, at different times, displays information for different systems of the motor vehicle.

2. The method according to claim 1, wherein a time-of-flight camera determines when the hand is approaching the gear selector.

3. The method according to claim 1, wherein the secondary display is an instrument cluster display or a heads-up display projected onto a windshield of the motor vehicle.

4. The method according to claim 1, wherein the secondary display is a heads-up display projected onto a windshield of the motor vehicle.

5. The method as claimed in claim 1, wherein
   the transmission information comprises engine speed and vehicle speed,
   the gear selection information comprises a currently engaged gear,
   the primary display is a first portion of an instrument cluster display,
   the secondary display is a second portion of the instrument cluster display or a heads-up display projected onto a windshield of the motor vehicle, and
   the transmission information is displayed before the hand is approaching the gear selector and maintained after the gear is changed.

6. The method according to claim 1, wherein if it is determined that only a passenger's hand is approaching the gear selector, the gear selection information is not displayed on the secondary display.

7. The method according to claim 6, wherein
   a time-of-flight camera is used to determine when the hand is approaching the gear selector, and the time-of-flight camera is used to determine whether a driver's hand or the passenger's hand is approaching the gear selector.

8. The method according to claim 1, wherein the gear selection information is selected from the group consisting of a currently engaged gear, engine speed and a new gear suggestion.

9. The method according to claim 1, wherein the gear selection information remains displayed in the secondary display while the hand touches the gear selector.

10. The method according to claim 9, wherein the gear selection information is removed from the secondary display as soon as the hand is removed from the gear selector.

11. The method according to claim 9, wherein, when the hand is removed from the gear selector, the gear selection information remains displayed on the secondary display for a time shorter than a time period that would be required for a driver to read the gear selection information on the secondary display if the gear selection information first appeared on the secondary display only after the gear selector was moved.

12. The method according to claim 1, wherein the gear selection information is removed from the secondary display as soon as a driver shifts gears.

13. The method according to claim 1, wherein
the gear selection information is displayed for a display time that depends on how fast the motor vehicle is currently travelling, such that at higher speeds, the display time is shortened.

14. The method according to claim 13, wherein the display time is shortened by at least one of:
requiring that the hand be closer to the gear selector before initiating the display of the gear selection information, and
reducing the display time for which the gear selection information remains displayed.

15. The method according to claim 1, wherein
the secondary display displays navigation information for a navigation system of the motor vehicle, and
at least a part of the navigation information is excluded from the secondary display when displaying gear selection information in the secondary display.

16. A motor vehicle comprising:
a transmission having a gear selector;
a primary display to display transmission information;
a secondary display to display gear selection information, the secondary display being a multi-use changeable display that, at different times, displays information for different systems of the motor vehicle;
a gesture recognition device to recognize when a hand is approaching the gear selector; and
a controller to initiate a display of, and then display, gear selection information on the secondary display while the hand is approaching the gear selector, before the hand touches the gear selector.

* * * * *